(12) United States Patent
Schoner (10) Patent No.: US 7,466,362 B2
(45) Date of Patent: Dec. 16, 2008

(54) DATA RATE MANAGEMENT SYSTEM AND METHOD FOR A/V DECODER

(75) Inventor: Brian Schoner, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 594 days.

(21) Appl. No.: 10/462,955

(22) Filed: Jun. 17, 2003

(65) Prior Publication Data

US 2004/0075766 A1    Apr. 22, 2004

Related U.S. Application Data

(60) Provisional application No. 60/420,344, filed on Oct. 22, 2002.

(51) Int. Cl.
*H04N 5/04* (2006.01)

(52) U.S. Cl. ..................................... 348/512

(58) Field of Classification Search ................. 348/500, 348/512, 518, 464, 515, 536, 510
See application file for complete search history.

(56) References Cited

U.S. PATENT DOCUMENTS

| | | | | | |
|---|---|---|---|---|---|
| 5,574,512 | A | * | 11/1996 | Saeger | 348/620 |
| 6,101,591 | A | * | 8/2000 | Foster et al. | 711/219 |
| 6,154,509 | A | * | 11/2000 | Bishop | 375/371 |
| 6,313,879 | B1 | * | 11/2001 | Kubo et al. | 348/512 |
| 6,429,902 | B1 | * | 8/2002 | Har-Chen et al. | 348/518 |
| 6,606,127 | B1 | * | 8/2003 | Fang et al. | 348/500 |
| 6,611,530 | B1 | * | 8/2003 | Apostolopoulos | 370/442 |
| 6,754,295 | B1 | * | 6/2004 | Hartnett | 375/356 |
| 6,801,591 | B1 | * | 10/2004 | Frencken | 375/373 |
| 6,862,045 | B2 | * | 3/2005 | Morimoto et al. | 348/515 |
| 6,917,247 | B2 | * | 7/2005 | Schoner | 331/18 |
| 6,970,526 | B2 | * | 11/2005 | Min | 375/354 |
| 7,012,650 | B2 | * | 3/2006 | Hu et al. | 348/515 |
| 7,023,488 | B2 | * | 4/2006 | Szybiak et al. | 348/484 |
| 2002/0150126 | A1 | * | 10/2002 | Kovacevic | 370/503 |
| 2004/0001695 | A1 | * | 1/2004 | Evans et al. | 386/68 |
| 2004/0078418 | A1 | * | 4/2004 | Law et al. | 709/201 |
| 2004/0078501 | A1 | * | 4/2004 | Law et al. | 710/52 |

FOREIGN PATENT DOCUMENTS

| WO | WO 99/52298 | 10/1999 |
|---|---|---|
| WO | WO-99/52298 | * 10/1999 |

* cited by examiner

*Primary Examiner*—Paulos M Natnael
(74) *Attorney, Agent, or Firm*—McAndrews Held & Malloy, Ltd.

(57) ABSTRACT

Devices and methods are disclosed for managing an output of an output stream. One embodiment relates to a method of tracking an output of an A/V decoder. In this embodiment, indication of an output stream time reference and a location of at least one output sample are received. The received time reference is compared to the output sample and the output sample rate of the A/V decoder is adjusted.

25 Claims, 8 Drawing Sheets

DATA RATE MANAGEMENT SYSTEM AND METHOD FOR A/V DECODER

CROSS-REFERENCE TO RELATED APPLICATIONS

This application is related to, and claims benefit of and priority from, Provisional Application No. 60/420,344 filed on Oct. 22, 2002, titled "Data Rate Management System and Method For A/V Decoder", the complete subject matter of which is incorporated herein by reference in its entirety.

U.S. Provisional Application Ser. No. 60/420,152 filed Oct. 22, 2002, titled "A/V Decoder Having A Clocking Scheme That Is Independent Of Input Data Streams"; U.S. patent application Ser. No. 10/300,371 filed Nov. 20, 2002, titled "A/V Decoder Having A Clocking Scheme That Is Independent Of Input Data Streams"; U.S. Provisional Application Ser. No. 60/420,136 filed Oct. 22, 2002, titled "NCO Based Clock Recovery System and Method for A/V Decoder"; U.S. patent application Ser. No. 10/313,237 filed Dec. 5, 2002, titled "NCO Based Clock Recovery System and Method for A/V Decoder"; U.S. Provisional Application Ser. No. 60/420,342 filed Oct. 22, 2002, titled "A/V System and Method Supporting a Pull Data Flow Scheme"; U.S. patent application Ser. No. 10/300,234 filed Nov. 20, 2002, titled "A/V System and Method Supporting a Pull Data Flow Scheme"; U.S. Provisional Application Ser. No. 60/420,140 filed Oct. 22, 2002, titled "Hardware Assisted Format Change Mechanism in a Display Controller"; U.S. patent application Ser. No. 10/300,370 filed Nov. 20, 2002 titled "Hardware Assisted Format Change Mechanism in a Display Controller"; U.S. Provisional Application Ser. No. 60/420,151 filed Oct. 22, 2002, titled "Network Environment for Video Processing Modules"; and U.S. patent application Ser. No. 10/314,525 filed Dec. 9, 2002 titled "Network Environment for Video Processing Modules" are each incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

The present invention relates to decoders adapted to process input data streams (alternatively referred to as "input data", "input data streams" or "data streams"). More specifically, the present invention relates to a data rate management system and method for audio/visual decoders (alternatively referred to as "A/V decoders"). The A/V decoders are adapted to process, decode or decompress input data streams that are coded or compressed using a compression format, while the data rate manager system and method tracks the output stream of the A/V decoder to a timebase.

Currently, a plurality of formats or techniques is used to compress audio-video programs for transmission and storage. See, for example, the compression standards set forth in ISO/EC IS 13818-1,2,3: Information Technology-Generic Coding of Moving Pictures and Associated Audio Information: Systems, Video and Audio (alternatively referred to as "MPEG-2") including Annex D thereof (alternatively referred to as "Annex D"); ISO/EC IS 11172-1,2,3: Information Technology-Generic Coding of Moving Pictures and Associated Audio for Digital Storage Media at up to about 1.5 Mbits/sec: Systems, Video and Audio (alternatively referred to as "MPEG-1"); Dolby AC-3; Motion JPEG, etc, each of which is incorporated herein by reference in its entirety.

Currently available A/V decoders generally include one or more clock devices. These clock devices ensure that the output of the audio and video samples, data or other information (collectively referred to as "data") is output at the same rate the data is received and input into the A/V decoder. For example, currently available A/V decoders are based on MPEG-2 transport of data. To ensure proper operation of such A/V decoders (and any larger A/V system incorporating such A/V decoders) the data output rate of the A/V decoder must match the data input rate of the A/V decoder to prevent overflow or underflow of the A/V decoder buffers. This means that the output video frame rate of the A/V decoder must match its compressed input frame rate and the output audio sample rate of the AN decoder must match its compressed input audio sample rate.

To accomplish such synchronization in known A/V system, MPEG-2 transport synchronizes the transmitter (the headend in an A/V system for example) and the receiver (the A/V decoder in an A/V system for example) using a system time clock (alternatively referred to as an "STC", which may comprise a common 27 MHz clock for example). Further, the transmitter transmits or communicates one or more program clock references (alternatively referred to as "PCR") to the receiver. The receiver uses the one or more PCRs to synchronize itself with the transmitter.

Such synchronization in the A/V system may be accomplished using a phase-locked loop (alternatively referred to as a "PLL"). Typically the receivers include a local clock (for example a voltage-controlled oscillator, alternatively referred to as a "VCO"). The receiver compares its local clock to the PCR. If the receiver's local clock is slower than or behind the PCR, the receiver accelerates the local clock. If the receiver's local clock is faster than or ahead of the PCR, the receiver decelerates the local clock. It is contemplated that eventually, the receiver's local clock is synchronized with the STC. Subsequently, the MPEG transport synchronizes the video and audio to the STC. It is further contemplated that most video and audio frames include a presentation time stamp (alternatively referred to as "PTS") and/or a decode time stamp (alternatively referred to as "DTS"). The receiver (the A/V decoder for example) may use such PTS and/or DTS stamps to determine when to decode and display each frame relative to the STC.

It is further contemplated that the local clock (the VCO for example) is used to clock one or more audio/video digital-to-analog converters (alternatively referred to as "DACs") in the A/V decoders. Using the local clock to clock the one or more DACS ultimately determines the video frame rate and audio sample rate at the output of the A/V decoder. Since the local clock is locked to the STC, the output rates of the A/V decoder are thus locked to the transmitter.

However, A/V systems are growing more complex, requiring that A/V decoders integrate more features. A complex A/V decoder may decode several streams simultaneously, requiring several different local clocks. For example one set-top box including a decoder may support two televisions. Each television may display different programs. It is contemplated that each television may be able to support picture-inpicture (alternatively referred to as "PIP"), such that each television may display two different programs simultaneously. In this example, the set-top box may also decode another program to record for future playback. It is contemplated that different local clocks are used to clock all these programs. Furthermore, a complex A/V decoder may require additional synchronous clocks for DRAM and/or internal interfaces (DVI, Ethernet and USB for example).

Typically, existing A/V decoders rely on VCOs for A/V decoding and processing. Advanced A/V decoders with picture-in-picture or PIP or multiple displays may require several VCOs. However, high quality VCOs are expensive. Using a plurality of VCOs in the A/V decoder will affect its production costs and ultimately its retail price. It is contemplated that using multiple clocks (e.g., VCOs) may complicate decoder design. For example, clock balancing, static timing analysis and asynchronous data transfer in the A/V decoders are all affected by multiple clocks. Further, it is known that currently available VCOs may lock to other system clocks (which is sometimes referred to as "injection locking"). Therefore, using multiple VCOs in an A/V decoder may cause such VOC to become locked, ultimately affecting the performance of the A/V decoders.

VCOs are analog components. This means that performance of each VCO may vary depending on the temperature, process and manufacturer. This variance makes designing A/V decoders using such VCOs difficult. Additionally, sharing hardware (video scaler for example) in the A/V decoder is difficult, if such hardware is run at the STC clock rate.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Features of the present invention may be found in a data rate management system and method for an A/V decoder. The data rate management system and method may be used to track an output stream of the A/V decoder.

One embodiment relates to a method of tracking or managing a rate of an output of an A/V decoder. In this embodiment, an indication of an output stream time reference signal and a location of at least one output sample are received. The received time reference signal is compared to the output sample, and the output sample rate of the A/V decoder is adjusted. This embodiment further relates to receiving a location of a current output sample, and determining if the output sample location leads or lags the time reference signal. If the output sample location leads the time reference signal, the output sample rate is slowed or decreased. However, if the output sample location lags the time reference signal, the output sample rate is sped-up or increased.

Other embodiments further relate to indirectly adjusting the output sample rate, using at least one rate control signal and at least one next sample request signal as feedback. Still other embodiments relate to directly adjusting the output sample rate using at least one phase signal.

Yet another embodiment relates to method of decoding data using an A/V decoder. In this embodiment, the method comprises recovering timing information from an input stream and receiving a location of a current output sample. An output sample rate of an output stream is controlled using the timing information and the output stream is output having a fixed clock rate asynchronous to the timing information. Other embodiments comprise receiving an input stream and using at least an indication of the recovered timing information to control the output sample rate.

Still other embodiments comprise controlling the output sample rate of the A/V decoder, by determining if the location of the current output sample lead or lags the recovered timing information. If the current output sample location leads the recovered timing information, the output sample rate is slowed down or decreased. If, however, the current output sample location lags the recovered timing information, the output sample rate is increase or sped-up.

Another embodiment of the present invention relates to a rate managed output device adapted to tracking or manage a rate of an output of an A/V decoder. In this embodiment, the rate managed output device is adapted to receive at least an indication of an input output stream time reference signal and a location of at least one output sample. The rate managed output device compares the time reference signal to the output sample and adjust an output sample rate.

One embodiment relates to an A/V decoder adapted to decode data in one or more data streams. This embodiment comprises a rate manager adapted to track an output of the A/V decoder and a system time reference receiver communicating with the rate manager and adapted to receive at least one system time reference signal. Other embodiments comprise the rate managed clock using a time reference that is asynchronous to a time reference of an input stream to the A/V decoder. Related embodiments comprises at least one sample rate conversion device (a digital sample rate conversion device for example) adapted to receive at least one rate control signal from the rate manager, at least one direct control device coupled to the rate manager, with at least one sample rate conversion device adapted to receive at least one phase control signal from the direct control device. In one embodiment, by employing a sample rate conversion, the output sample clock may be independent of the time reference of the input stream to the A/V decoder.

These and other advantages and novel features of the present invention, as well as details of an illustrated embodiment thereof, will be more fully understood from the following description and drawings.

DETAILED DESCRIPTION OF THE INVENTION

The following description is made with reference to the appended figures.

As A/V decoders increase in complexity, integrating more functionality, the number of clocks in the A/V decoders increase. Some recent decoders have incorporated a plurality of domains. The large number of clock domains greatly complicates the back-end process of the A/V decoders, including static timing analysis (alternatively referred to as "STA"), layout, scan, clock insertion and balancing, and verification.

Figure 1:
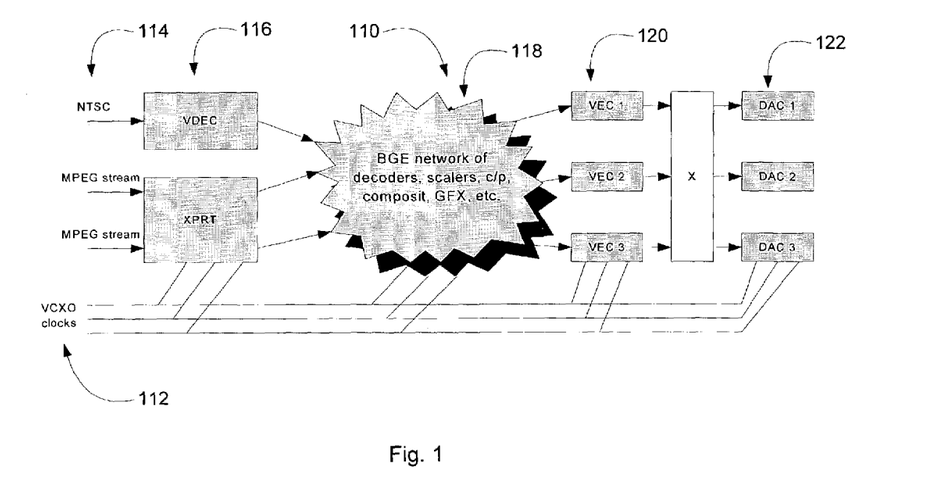
FIG. 1 illustrates a block diagram of one example of a VCXO-based video system.

It is also contemplated that the large number of clock domains may complicate the front-end design work of the A/V system including A/V decoders. Asynchronous interfaces are awkward to build, and difficult to verify. A/V systems, on one or multiple chips, having multiple A/V decoders may try to route/mix/mux between the different input data streams. These operations are difficult as the input data streams may be in different time bases, and have different timing references FIG. 1 illustrates a block diagram of one example of a prior-art VCXO-based video system, generally designated 110. The plurality of VCXO clocks 112 are muxed into every module including the network 118, here comprised of one or more decoders, scalers, video capture & playback (alternatively referred to as "c/p"), composite, graphics (alternatively referred to as "GFX"), etc.

The input data streams 114, here comprising NTSC and one or more MPEG steams for example, use the clocks 112 for program clock reference or PCR recovery. The video decoders (alternatively referred to as "VDEC") and MPEG transport (alternatively referred to as "XPRT"), both generally designated 116, use the clocks 112 for PTS comparison, while the Video encoders (alternatively referred to as "VECs") video digital to analog converters (alternatively referred to as "DACs"), generally designated 120 and 122 respectively, output data at the correct clock rates. It is contemplated that the VECs 120 and DACs 122 require considerable clock or reference muxing to support SCART/composite/component outputs. Such clock or reference muxing complicates the system 110 layout, STA, and scan. Furthermore, clock or reference muxing may cause glitches on the clocks 112.

One embodiment of the present invention simplifies both the back-end and front-end design of A/V systems, including the design of the A/V decoders. Clocks (PLLs and VCXOs for example) add directly to the cost of the systems. Increasing the number of clocks correspondingly increases the material cost for manufacturing the systems. One embodiment of the present invention reduces the number of asynchronous clock domains and eliminates clock muxes. Reducing the number of clocks, along with eliminating the clock muxes, may reduce the material cost of building the A/V decoders Embodiments of the present invention relates to a method of decoding MPEG video for example using an A/V decoder in accordance with the present invention. In this embodiment, system time references are recovered from input data streams and the output rates are controlled using such recovered system time references. One or more audio/video decoders in the A/V decoder determine when to decode each frame compliant with MPEG standards. In this embodiment, the audio/video decoders compare a time stamp (PTS/DTS) with the system time reference. Such PTS/STR comparison is defined in the MPEG standards.

Figure 2A:
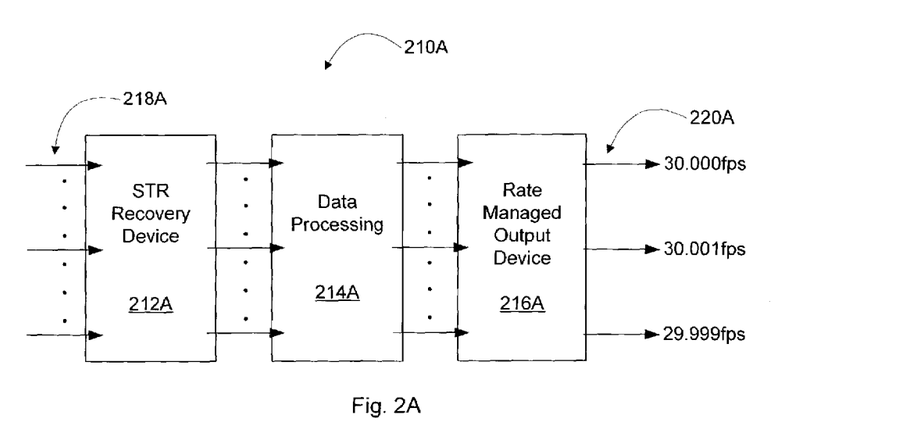
FIGS. 2A and 2B illustrate block diagrams of embodiments of an A/V decoder in accordance with the present invention.
Figure 2B:
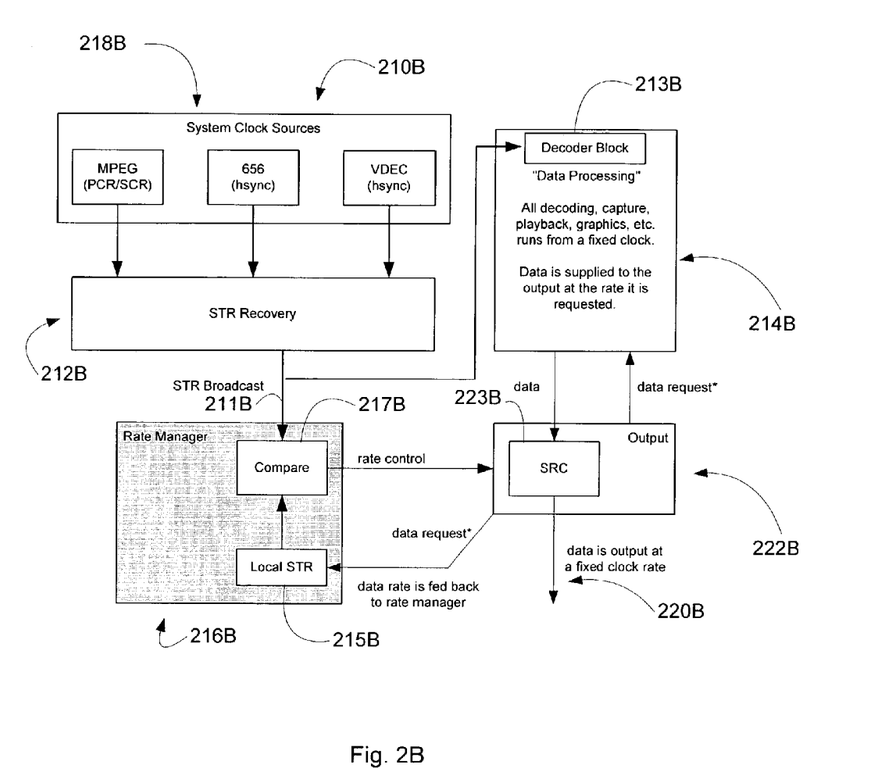

One embodiment of the present invention relates to an A/V decoder device that decodes one or more input data streams with multiple output rates using a single clock reference. This embodiment enables A/V decoders with multiple time bases to be implemented using a single clock reference (alternatively referred to as a "system clock"). FIGS. 2A and 2B illustrate block diagrams of embodiments of an AN decoder 210 in accordance with the present invention.

In an MPEG scheme currently used in A/V decoders, the system clock is locked to the PCR. For ITU656 video for example, such currently available A/V decoders must output one pixel every 2 clock cycles. The output pixel rate is locked to the system clock, and the system clock is locked to the incoming PCR values. However, in one embodiment of the present invention, the system clock is independent of the PCR values and the output pixel rate. The video SRC (digital sample rate converter) output requests pixels from the A/V decoder. In other words, the A/V decoder supplies pixels at the rate the pixels are requested (i.e., the pixels are "pulled"). Similarly the audio SRC output requests audio samples at a specified rate from the audio decoder. The audio decoder provides samples as requested (i.e., the samples are pulled).

FIG. 2A illustrates a high level block diagram of one embodiment of an A/V decoder, generally designated 210A, in accordance with one embodiment of the present invention. More detail about the A/V decoder is provided in U.S. Provisional Application Ser. No. 60/420,152 filed Oct. 22, 2002, titled "A/V Decoder Having A Clocking Scheme That Is Independent Of Input Data Streams" and U.S. patent application Ser. No. 10/300,371 filed Nov. 20, 2002, titled "A/V Decoder Having A Clocking Scheme That Is Independent Of Input Data Streams", the complete subject matter of which is incorporated herein by reference in its entirety. In the illustrated embodiment, the decoder 210A comprises a system time reference recovery device 212A (alternatively referred to as an "STR recovery device") having one or more input data streams 218A. It is contemplated that, in one embodiment, the STR recovery device 212A may comprise a digital PLL.

The STR recovery device 212A is illustrated communicating with an data processing device 214A. In one embodiment of the invention, STR refers to a reference time value, a 43-bit reference time value for example. However, it is anticipated that different or more complex systems are contemplated. For example if the A/V decoder 210A has more than one data source, the decoder may include more than one STR, where the number of STRs may or may not correspond to the number of data sources. More detail about the STR recovery device is provided in U.S. Provisional Application Ser. No. 60/420,136 filed Oct. 22, 2002, titled "NCO Based Clock Recovery System and Method for A/V Decoder" and U.S. patent application Ser. No. 10/313,237 filed Dec. 5, 2002, titled "NCO Based Clock Recovery System and Method for A/V Decoder, the complete subject matter of which is incorporated herein by reference in its entirety.

As an alternative to the MPEG scheme, an A/V system incorporating an A/V decoder in accordance with the present invention may accept analog television signals as inputs. In this embodiment, the analog video input goes through, and is processed or decoded by, the data processing device 214A, which may comprise a video decoder (alternatively referred to as a "VDEC"). Likewise an analog audio goes through, and is processed or decoded by, the A/V data processing device 214A, which may further comprise a BTSC audio decoder (alternatively referred to as a "ADEC" or "BTSC").

In conventional decoders using VDEC/ADECs, the decoders lock the output rate to the input rate to process the data. Such conventional decoders lock a PLL/CXO to the analog video line rate, and use this clock to control the video/audio A/D conversion and the output rate. This method requires a separate, unique clock for each analog input.

One embodiment of the present invention uses a system clock (a fixed system clock for example) to control the data processing. It is contemplated that the STR recovery device 212A may be locked to the analog video line rate. The analog hysncs are converted into a psuedo-STR using a simple counter in one embodiment. The STR recovery device 212A locks to this psuedo-STR and broadcasts the recovered STR to the rest of the decoder 210A. The broadcast STR is used to control the output rates as provided previously.

FIG. 2A further illustrates a rate managed output device 216A which is illustrated as communicating with the data processing device 214A. In the illustrated embodiment, the rate managed output device 216A has one or more AN outputs 220A, which are output at the same or different rates. In FIG. 2A, three A/V outputs, generally designated 220A, are illustrated. For example, one A/V output is output at 29.999 frames per second (alternatively referred to as "fps"), one is output at 30.001 fps and one is output at 30.000 fps. The plurality of outputs in this FIG. 2A illustrate that a plurality of outputs are contemplated, where each of the outputs may be at different rates and/or illustrate that one or more outputs may vary over time.

As provided previously, MPEG requires a fixed relationship between the video pixel clock and the audio sample rate. To maintain this relationship, the audio sample rate is locked to the video line rate.

In one embodiment of the present invention, a VDEC STR broadcast is used to control an additional SRC of the BTSC output. This SRC is used to lock the audio sample rate to the video line rate. This helps ensure a fixed number of audio samples per video line. In one embodiment, the data processing device 214A bases audio and video processing on multiples of a single, fixed clock, a 27 MHz crystal clock for example. It is contemplated that, as a single fixed clock is used, the processing is not constrained by clock boundaries. Video and audio may be muxed between modules. It is further contemplated that the architecture may be made orthogonal, and easy to control.

In accordance with one embodiment, all data, including all audio and video data, is transferred using a "pull" model, even though typical A/V streams (e.g., MPEG) are adapted to operate according to a push mode. More detail about the pull model is provided in U.S. Provisional Application Ser. No. 60/420,342 filed Oct. 22, 2002, titled "A/V System and Method Supporting a Pull Data Flow Scheme" and U.S. patent application Ser. No. 10/300,234 filed Nov. 20, 2002, titled "A/V System and Method Supporting a Pull Data Flow Scheme", the complete subject matter of which is incorporated herein by reference in its entirety. The outputs request data, as it is needed. Each module in the A/V decoder 210A supplies data to its outputs at the rate it is requested. Because a "pull" model is used, the data processing clock (i.e., the system clock) is not tied to the input data rate. For example, the audio decoder may be clocked at 243 MHz, 133 MHz, or any other reasonable rate. The audio decoder clock does not need to "track" the input data rate.

Conventional A/V decoders use a VCXO or VCXO-PLL to lock the chip clock to the input data rate. However, one embodiment of the present invention uses rate managed output devices 216A and the associated SRC devices to change or adjust the video and audio output rates. It is contemplated that, when compared to currently available VCXO-based decoders, A/V decoders including exemplary rate manage output and SRC devices enable: fewer clock domains; fewer VCXOs; fewer PLLs; easier switching of data paths; easier scaling; and easier CPU control.

It is contemplated that, in one embodiment of the present invention, the output data rate tracks the STR. If the A/V decoder decodes multiple video streams, there may be multiple STRs. Each output data rate tracks an associated STR. The process of controlling the output rates may be called "rate management." In one embodiment, the rate managed output device 216A (alternatively referred to as a "output rate manager" or "output rate manager PLL"), comprising for example a digital PLL, is used to compare the output rate with the STR, and adjust the output rate accordingly, such that the output data rate matches the STR and the input data rate. In one embodiment the A/V decoder may include several output rate managers, one for each output of the A/V decoder.

It is contemplated that, in accordance with the present invention, the audio and video output rates might be adjusted in several ways. In one embodiment of the present invention, the rate managed output device 216A may use a VCXO-PLL or NCO for example to create a clock. Such clock could be used to clock the audio and video outputs, where the rate managed output device 216A adjusts the VCXO-PLL to change the output rate. Further, another embodiment of the rate managed output device 216A uses a sample rate conversion (alternatively referred to as "SRC") process or method, discussed in greater detail below, to change or adjust the audio and video output rates.

FIG. 2B illustrates a block diagram of another embodiment of an A/V decoder, generally designated 210B, in accordance with one embodiment of the present invention. In the illustrated embodiment, the decoder 210B comprises an STR recovery device 212B having one or more input data streams 218B and a STR broadcast output 211B.

In the illustrated embodiment, the input data streams (alternatively referred to as "system clock sources" or "system reference sources") 218B comprise an MPEG (PCR/SCR) stream, a 656 (hysnc) stream and a VDEC (hysnc) stream. While three input data streams are illustrated, more complex systems, having more or different input data streams are contemplated. In the illustrated embodiment, the input time references are MPEG PCR/SCR values. However, for analog video or ITU656 video, the hsync timing may be used as the time reference or a fixed timing reference may be used for PVR playback.

The STR recovery device 212B is illustrated communicating with a data processing device 214B including at least one decoder block 213B adapted to receive the STR broadcast 211B. The data processing device 214B is adapted to decode, capture, play back and produce graphics, etc. using a fixed clock or timing reference. That is, the data processing devices may decode, capture, play back and produce graphics, etc. using a fixed clock (i.e., the system clock for example). In one embodiment, the data is supplied to an output device or buffer 222B as requested (i.e., the output device requests data from the data processing device and the data is provided as requested, i.e., the data is "pulled").

A rate managed output device 216B is illustrated as communicating (indirectly in this embodiment) with at least the data processing device 214B. More specifically, the rate managed output device 216B communicates with the STR recovery device 212B and the output device 222B. In the illustrated embodiment, the rate managed output device 216B comprises at least local-STR and compare devices 215B and 217B respectively, while the output device 222B comprises at least an SRC device 223B. The rate manager 216B controls the output data rate.

In one embodiment, the output device 222B outputs data 220B at a fixed clock rate (i.e., the system clock rate) as it is requested. The output device 222B submits data requests to the data processing device 214B, and thus pulls the data. The data request is also submitted or mirrored to the rate managed output device 216B, where it is compared with the STR broadcast in the compare device 217B. A rate control signal is communicated to the output device 222B (specifically the SRC device 223B) by the rate manager 216B, ensuring that the data 220B is output at the fixed clock rate, and the output data rate matches the input data rate. The digital sample rate converter converts data from an input sample rate to an output sample rate. In one embodiment, the output sample rate may differ from the input sample rate. By adjusting the SRC parameters, using digital interpolation for example, the rate managed output device 216B changes the rate of the sample rate at the input of the SRC device 223B. This change to the sample rate changes the rate the data is requested from the data processing device 214B.

Figure 3:
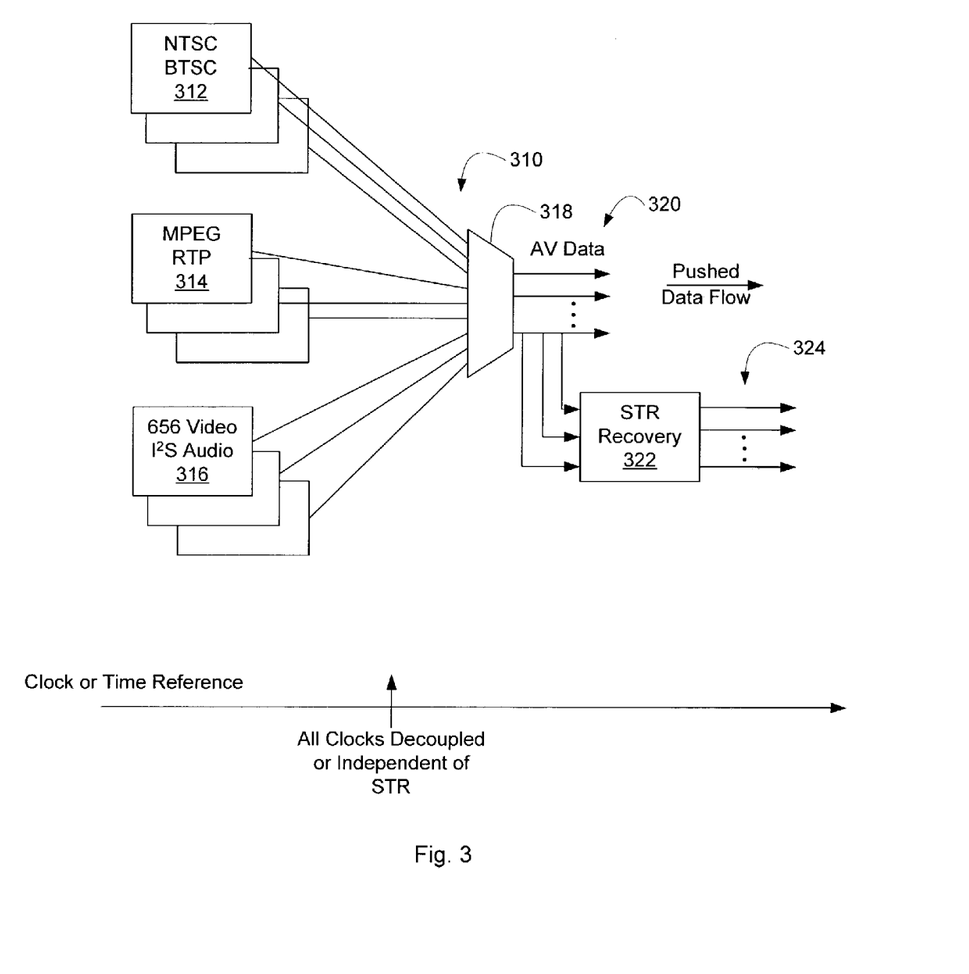
FIG. 3 illustrates a block diagram of an embodiment of the input data streams and the STR recovery device similar to that of FIGS. 2A and 2B in accordance with the present invention.

FIG. 3 illustrates a block diagram of an embodiment of the data input streams and the STR recovery device similar to that of FIGS. 2A and 2B in accordance with the present invention. A plurality of video and audio input data streams are illustrated, for example NTSC and BTSC streams, generally designated 312, MPEG and RTP streams, generally designated 314, and 656 and I²S streams, generally designated 316, are all illustrated as inputs to mux 318. While only one mux 318 is illustrated, two or more muxes are contemplated. Furthermore, while these input schemes are illustrated, other input streams, or different combinations thereof, are contemplated.

The mux 318 outputs a plurality of muxed A/V data in a pushed manner, generally designated 320. It is contemplated that all the clocks associated with the input streams are decoupled or independent of the STR. The STR recovery device 322 (similar to the STR recovery devices 212A and 212B discussed previously) outputs one or more system timing references are recovered from the A/V data.

Conventional decoders output data with VDACs/ADACs locked to the input rate as provided previously. For example, such decoders may lock a PLL/VCXO to the analog video line rate, and use this clock to control the video/audio A/D conversion. This method requires a separate, unique clock for each analog video input.

One embodiment of the present invention uses a system clock or system clock reference (a fixed system clock for example) to control the video/audio processing in the data processing device. The STR recovery device 322 is used to lock to the analog video line rate. The analog hysncs are converted into a psuedo-STR using a simple counter in one embodiment. The STR recovery device 322 locks to this psuedo-STR and broadcasts the recovered STR to the rest of the decoder. The broadcast STR is used to control (i.e., adjust or match) the output rates as provided previously.

Figure 4:
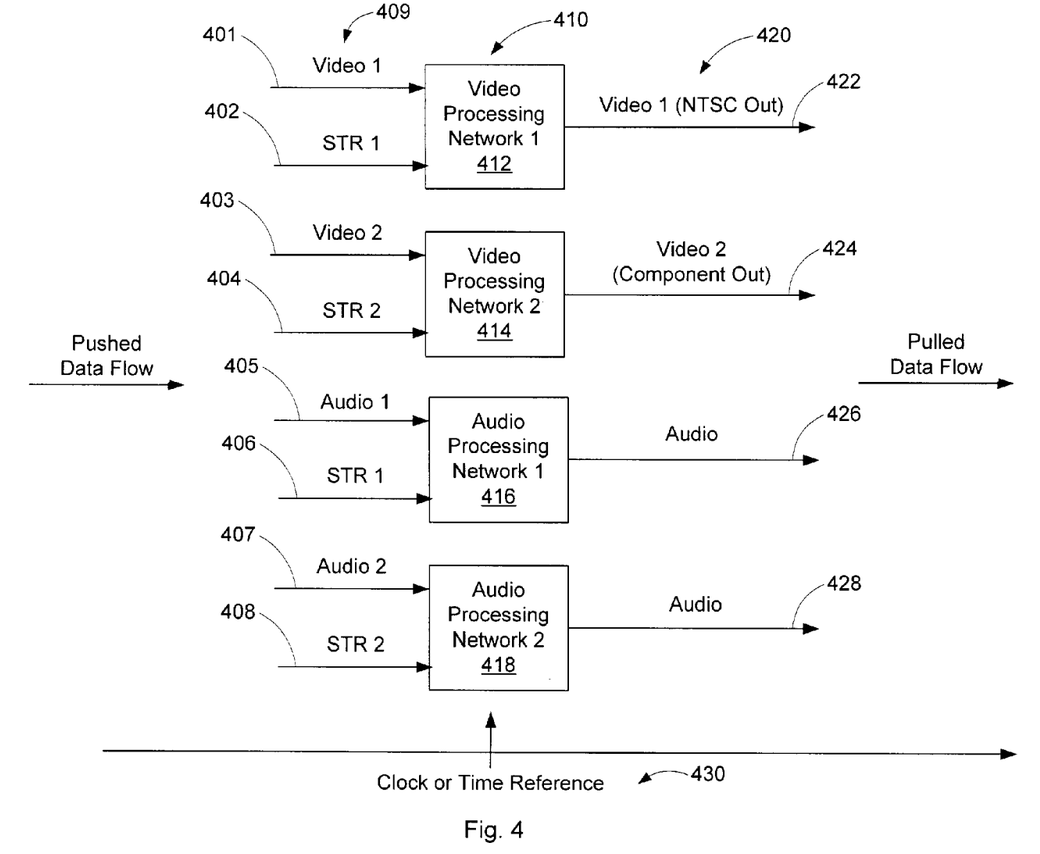
FIG. 4 illustrates a block diagram of an embodiment of the data processing device similar to that illustrated in FIGS. 2A and 2B, processing video data in accordance with the present invention.

FIG. 4 illustrates a block diagram of one embodiment of the data processing device, generally designated 410, similar to that illustrated in FIGS. 2A and 2B. In this embodiment, the processing device 410 is adapted to process a plurality of audio and video data (for example at a fixed clock rate that is asynchronous to the time reference of the input stream) in accordance with one embodiment of the present invention using pushed data flow input streams, generally designated 409. In the illustrated embodiment, the decoder 410 comprises a plurality of video and audio processing networks. In FIG. 4, two video processing networks designated 412 and 414 respectively and two audio processing networks designated 416 and 418 respectively, are illustrated. It should be appreciated that while only two video and audio processing networks are illustrated, more (or less) than two video and audio processing networks or different process networks are contemplated.

In this embodiment, each of the processing networks of the data processing device 410 receives one or more video and/or audio inputs, generally designated 409, in a pushed manner and provides one or more outputs where the outputs include the video and/or audio and associated STR's, generally designated 420 in a pulled manner, where the output is provided as requested. As illustrated, video processing network 412 receives a video stream 1 and STR 1 as inputs, designated 401 and 402 respectively, and provides a video 1 output designated 422 in a pulled manner at a fixed clock rate. Likewise, video processing network 414 receives a video stream 2 and STR 2 as inputs, designated 403 and 404 respectively, and provides a video 2 output designated 424, in a pulled manner at a fixed clock rate.

Further, FIG. 4 additionally illustrates two audio processing networks, Audio 1 and 2, 416 and 418 respectively. As illustrated, audio processing network 416 receives an audio stream 1 and STR 1 as inputs, designated 405 and 406 respectively, and provides one audio output designated 426 in a pulled manner at a fixed clock rate. Further, audio processing network 418 receives an audio stream 2 and STR 2 as inputs, designated 407 and 408 respectively, and provides one audio output designated 428 in a pulled manner at a fixed clock rate. It should be appreciated that, in this embodiment, Video 1 and Audio 1 may be processed using the same STR while Video 2 and Audio 2 may be processed using the same STR.

In the illustrated embodiment, the entire video path is clocked using a single clock 430. The A/V decoder utilizes STR recovery and rate managed output devices to match the video outputs to the input data rates as provided previously.

As provided previously, the A/V decoder of the present invention uses "pull" data flow. That is, data is pulled out of the data processing device as requested. In one embodiment the video output path uses a video bus. Using a single 27 MHz crystal reference tends to reduce the number of clock domains.

Figure 5:
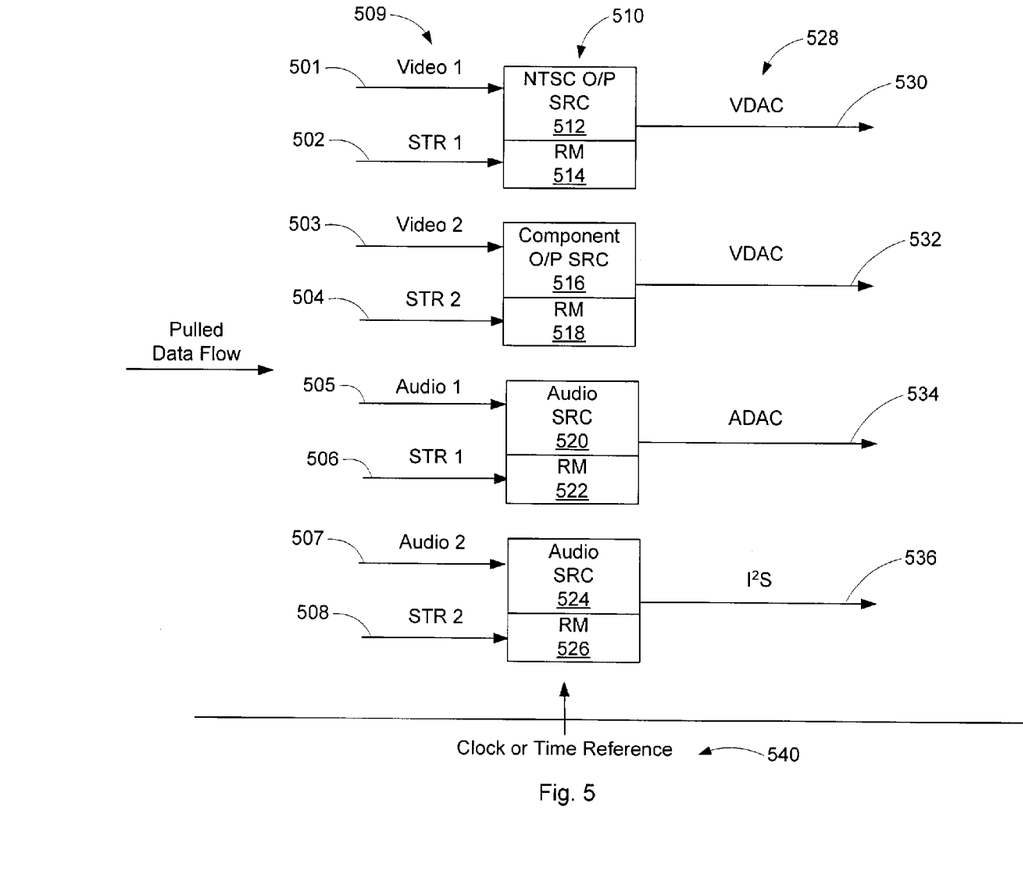
FIG. 5 illustrates a block diagram of an embodiment of the rate managed output device similar to that illustrated in FIGS. 2A and 2B, in accordance with the present invention.

FIG. 5 illustrates a block diagram one embodiment of the rate managed output device 510, similar to rate managed output devices illustrated in FIGS. 2A and 2B, using pulled data in accordance with the present invention. In one embodiment, device 510 comprises an NTSC O/P SRC device 512 with an attached or associated rate management output device 514 (alternatively referred to as an "RM device"), and a component O/P SRC device 516 with an associated RM device 518, an audio SRC device 520 with an associated RM device 522, and an audio SRC device 524 and associated RM device 526. In one embodiment of the present invention, the one or more SRC devices adjust the output data rates to track the system time references.

In this embodiment, each of the illustrated modules of the data processing device 510 receives one or more inputs, generally designated 509, in a pulled manner and provides an output, generally designated 528. The NTSC/OP SRC 512 receives a video 1 input 501 (which in one embodiment may be the Video 1 output illustrated in FIG. 4) and the associated RM receives an STR 1 input 502, outputting VDAC 530. Component O/P SRC 516 receives a video 2 input 503 (which in one embodiment may be the Video 2 output illustrated in FIG. 4) while its associated RM 518 receives an STR 2 input 504, outputting VDAC 532. The audio SRC 520 receives an audio 1 input 505 (which in one embodiment may be one of the audio outputs illustrated in FIG. 4) while its associated RM 522 receives a STR 1 input 506 outputting ADAC 534. The audio SRC 524 has an audio 2 input 507 (which in one embodiment may be one of the audio outputs illustrated in FIG. 4) and its associated RM 526 receives an STR 2 input 508, outputting $I^2$s 536. It should be appreciated that all of the above modules may be clocked from a single clock or time reference 540. It should be also be appreciated that FIG. 5 depicts that at least one embodiment of the present invention is adapted to decode a plurality of video and audio inputs using one or more STR broadcast. For example, Video 1 and Audio 1 may be decoded using the same STR broadcast (STR 1 for example), while Video 2 and Audio may be decoded using a different STR broadcast (STR2 for example).

In one embodiment of the present invention, sample rate conversion is used to convert A/V samples from the stream clock rate to the system clock. Note that the STR broadcast and the system clock may be different. It is contemplated that, due to age or the surrounding conditions for example, the clocks may drift slowly over time. The clocks are independent and are not locked. The SRC recovery loop adjusts for any differences between the SRT broadcast and the system clock, maintaining the input and output data rates.

Figure 6:
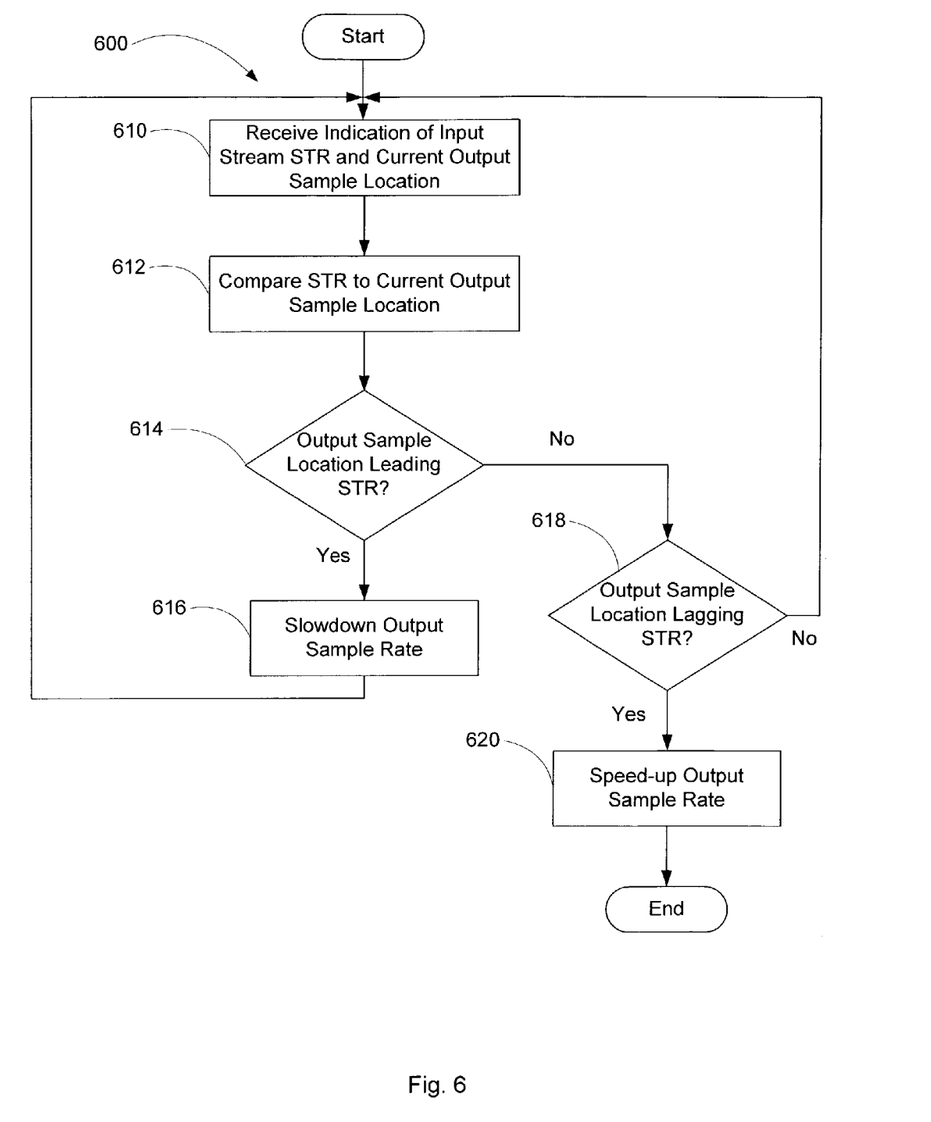
FIG. 6 illustrates a flow diagram of one embodiment for tracking a data rate of an output stream in accordance with the present invention.

FIG. 6 illustrates one embodiment of a flow diagram for tracking a data rate of an output stream to a time base, and generally designated 600. In the illustrated embodiment, the method 600 receives an indication of an input stream STR and the current output sample location as illustrated by block 610. The STR of the input stream is compared to the current output sample location as illustrated by block 612.

The method determines if the output sample location leads the STR of the input stream as illustrated by diamond 614. If the output sample leads the STR, the output sample rate is slowed down as illustrated by block 616, using digital interpolation for example.

If the output sample doesn't lead the STR, the method determines if the output sample location lags the STR as illustrated by diamond 618. If the output sample location lags the STR, the output sample rate is speed-up or increased as illustrated by block 620. It is contemplated that the method illustrated in FIG. 6 may be employed on a limited basis or may be employed continuously. In other words, method 600 may be specifically employed in a continuous fashion, so that method 600 receives another indication of an input stream STR and the current output sample location as illustrated by block 610, either for a limited or extended period of time after the sample rate is slowed down or speed-up.

Figure 7:
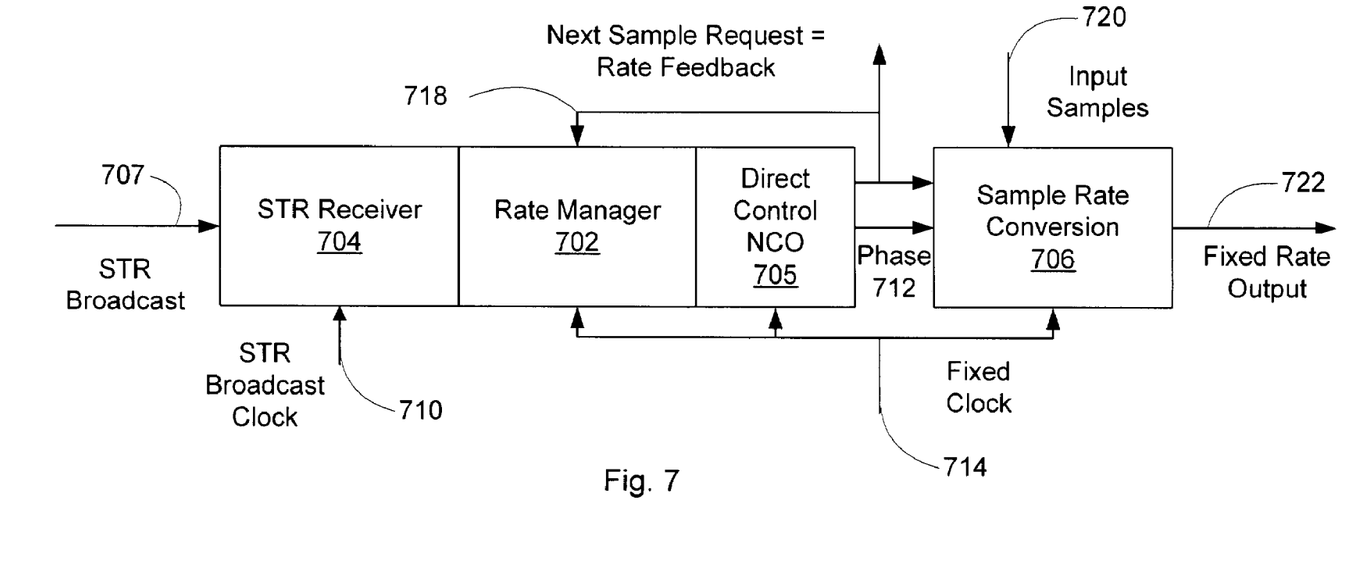
FIG. 7 illustrates a block diagram of an embodiment of a rate manager output device similar to that illustrated in FIGS. 2A and 2B in accordance with the present invention.

FIG. 7 illustrates one embodiment of a block diagram of a rate managed output device, generally designated 702. In this embodiment, an NCO device 705 is coupled to the rate manager device, providing direct control of the SRC 706. FIG. 7 further illustrates rate manager 702 coupled to and receiving one or more signals from an STR receiver 704, which in turn receives one or more STR broadcast 708 and STR Broadcast clock 710 signals as inputs.

The same fixed clock or time reference 714 (the system clock for example) clocks or provides a time reference for the rate manager 702, the SRC device 706 and the NCO device 705. On every clock cycle, the rate manager 702 controls the phase signals 712 used by the SRC device 706. In this embodiment, the phase signals 712 may be normalized to the range (0,1). Further, rate manager 702 receives one or more next sample request signals 718 as feedback, while the SRC device 706 receives one or more input samples 720 as input signals.

This embodiment may be referred to as "direct control" of the SRC device 706 and the output rate 722, as the rate manager 702 controls the one or more phase signals 712 used by the SRC device 706 as provided previously. It is contemplated that this illustrated embodiment may be used for SRC outputs that include a video encoder or VEC, audio digital to analog converters or ADAC, and BTSC. Further, it is contemplated that this embodiment may be used for SRC devices that are adapted to perform upconversion/upsampling.

Exemplary embodiments of the rate control manager, which directly control the SRC device as illustrated in FIG. 7, have several advantages over rate managers which provide for indirect control of the SRC device: the sample/phase control signals are easy to use; using sample/phase control signals may simplify the SRC device design; the direct control NCO may be used for several outputs as direct controlled outputs behave similarly (i.e., direct controlled outputs have similar loop gain); and the direct control NCO is very general and may be used in several blocks. It is further contemplated that the direct control NCO may be used to synthesize a SPDIF "clock," similar to direct digital synthesis (alternatively referred to as "DDS").

It is known that, in a conventional MPEG system, a faster or slower clock may be used to adjust the output rate. In accordance with one embodiment of the present invention, the rate manager (alternatively referred to as the rate control or managed output device or module) digitally interpolates or decimates the input data to change the sample rate using SRC. In this embodiment, SRC is used to interpolate new values between the existing samples. If the interpolated samples are output with the same clock, the effective output rate increases. The clock is constant, but the data rate has changed. It is contemplated that the output is indistinguishable from the MPEG "faster clock" method. In other words, one embodiment of the rate manager in accordance with the present invention uses SRC to change the output data rate, while using a fixed output clock rate. Additional information about digital interpolation may be found, for example, in J. PROAKIS & D. MANOLAKIS, INTRODUCTION TO DIGITAL SIGNAL PROCESSING, (1988), which is incorporated herein by reference in its entirety.

Figure 8:
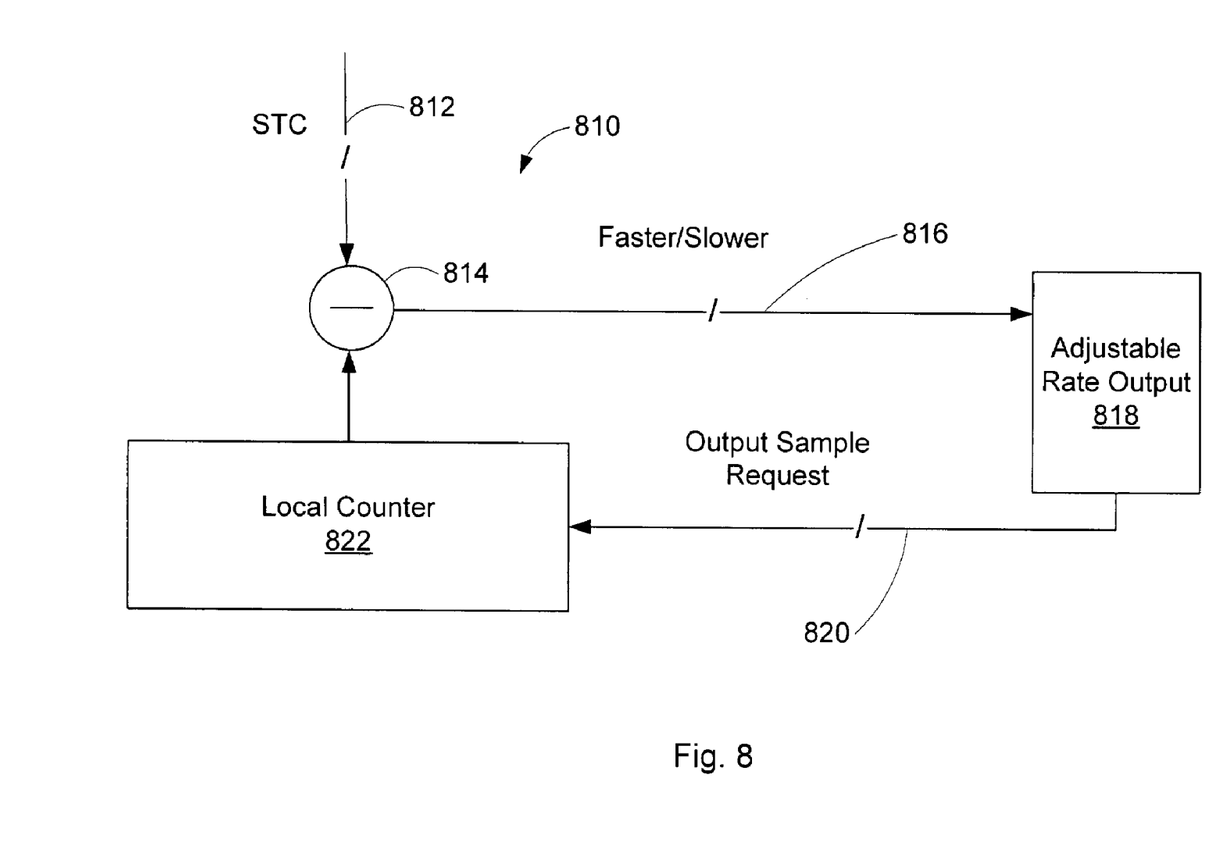
FIG. 8 illustrates a block diagram of circuit used in one embodiment of a rate manager output device in accordance with one embodiment of the present invention.

FIG. 8 illustrates a block diagram of circuit used in one embodiment of a rate manager similar to the rate managers provided previously in accordance with one embodiment of the present invention. It is contemplated that, in this embodiment, the output rates track the STC. The device, generally designated 810, receives one or more STC signals 812. In this embodiment, the device 810 maintains one or more local counters 822 (one for each output). The local counter 822 is incremented by a fixed value N every time a new sample enters the adjusted rate output device or module 818. For example, if the fixed value N=(27 MHz/nominal output sample rate) and the nominal output sample rate is 74.25 MHz HD output, then N=27/74.25=4/11).

The output of the local counter 822 is compared with the one or more STC signals 812 using comparator 814. If the local counter 822 is slow, one or more signals 816 is communicated to the adjusted rate output device or module 818 so that the adjusted rate output device or module 818 is accelerated (i.e., the output sample request 820 is increased). If however, the local counter 822 is fast, one or more signals 816 is communicated to the adjusted rate output device or module 818, such that the adjusted rate output device or module 818 is decelerated (the output sample request 820 is decreased). It is contemplated that this device 810 may be employed on a limited basis or may be employed continuously (i.e., in a repetitive fashion).

Many modifications and variations of the present invention are possible in light of the above teachings. Thus, it is to be understood that, within the scope of the appended claims, the invention may be practiced otherwise than as described hereinabove.

The invention claimed is:

1. A method of tracking an output of an A/V decoder comprising:
   (a) receiving an indication of an input stream time reference signal;
   (b) receiving a location of at least one output sample;
   (c) comparing said time reference signal to said output sample location; and
   (d) adjusting an output sample rate of the A/V decoder, wherein adjusting further comprises receiving at least one next sample request signal.

2. The method of claim 1, wherein step (b) further comprises receiving a location of a current output sample.

3. The method of claim 1, wherein step (c) further comprises determining if said output sample location leads said time reference signal.

4. The method of claim 3, wherein step (d) comprises slowing said output sample rate.

5. The method of claim 1, wherein step (c) further comprises determining if said output sample location lags said time reference signal.

6. The method of claim 5, wherein step (d) comprises speeding up said output sample rate.

7. The method of claim 1, further comprising repeating steps (a) through (d).

8. The method of claim 1, wherein step (d) comprises indirectly adjusting said output sample rate.

9. The method of claim 8, wherein step (d) comprises indirectly adjusting said output sample rate using at least one rate control signal.

10. The method of claim 9, wherein step (d) further comprises receiving the at least one next sample request signal as feedback.

11. The method of claim 1, wherein step (d) comprises directly adjusting said output sample rate.

12. The method of claim 11, wherein step (d) comprises directly adjusting said output sample rate using at least one phase signal.

13. A method of tracking an output of an A/V decoder comprising:
   (a) receiving an indication of an input stream system time reference signal;
   (b) receiving a location of a current output sample;
   (c) determining if said current output sample location leads or lags said system time reference signal;
   (d) decimating output samples if said current output sample location leads said system time reference signal; and
   (e) interpolating output samples if said current output sample location lags said system time reference signal.

14. The method of claim 13, comprising repeating steps (a) through (e).

15. A rate managed output device adapted to manage a rate of an output of an A/V decoder, wherein said rate managed output device is adapted to receive at least an indication of an input stream time reference signal; receive a location of at least one output sample, compare said time reference signal to said output sample location; adjust an output sample rate of said A/V decoder, and receive at least one next sample request signal as feedback.

16. The rate managed output device of claim 15, wherein receiving a location further comprises receiving a location of a current output sample.

17. The rate managed output device of claim 15, wherein comparing said time reference signal to said output sample location further comprises determining if said output sample location leads said time reference signal.

18. The rate managed output device of claim 17, wherein adjusting an output sample rate of the A/V decoder comprises slowing said output sample rate.

19. The rate managed output device of claim 15, wherein comparing said time reference signal to said output sample location further comprises determining if said output sample location lags said time reference signal.

20. The rate managed output device of claim 19, wherein adjusting an output sample rate of the A/V decoder comprises speeding up said output sample rate.

21. The rate managed output device of claim 15, wherein adjusting an output sample rate of the A/V decoder comprises indirectly adjusting said output sample rate.

22. The rate managed output of claim 21, wherein adjusting an output sample rate of the A/V decoder comprises indirectly adjusting said output sample rate using at least one rate control signal.

23. The rate managed output of claim 22, wherein adjusting an output sample rate of the A/V decoder further comprises receiving at least one next sample request signal as feedback.

24. The rate managed output of claim 15, wherein adjusting an output sample rate of the A/V decoder comprises directly adjusting said output sample rate.

25. The rate managed output of claim 24, wherein adjusting an output sample rate of the A/V decoder comprises directly adjusting said output sample rate using at least one phase signal.

* * * * *